US011015516B2

(12) United States Patent
Guenter et al.

(10) Patent No.: US 11,015,516 B2
(45) Date of Patent: *May 25, 2021

(54) METHODS AND SYSTEMS FOR HIGH AND LOW TEMPERATURE COOLANT CIRCUITS

(71) Applicant: Ford Global Technologies, LLC, Dearborn, MI (US)

(72) Inventors: Hans Guenter, Herzogenrath (DE); Jan Mehring, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

This patent is subject to a terminal disclaimer.

(21) Appl. No.: 16/403,290

(22) Filed: May 3, 2019

(65) Prior Publication Data

US 2019/0338696 A1    Nov. 7, 2019

(30) Foreign Application Priority Data

May 7, 2018    (DE) .......................... 10 2018 207 011

(51) Int. Cl.
| | |
|---|---|
| *F02B 29/04* | (2006.01) |
| *B60K 11/02* | (2006.01) |
| *B60K 11/06* | (2006.01) |
| *B60K 6/24* | (2007.10) |
| *F01P 7/14* | (2006.01) |
| *F01P 7/02* | (2006.01) |

(52) U.S. Cl.
CPC ............ *F02B 29/0443* (2013.01); *B60K 6/24* (2013.01); *B60K 11/02* (2013.01); *B60K 11/06* (2013.01); *F01P 7/02* (2013.01); *F01P 7/14* (2013.01); *F02B 29/0412* (2013.01); *F02B 29/0418* (2013.01); *F02B 29/0425* (2013.01); *F01P 2007/146* (2013.01); *F01P 2025/62* (2013.01); *F01P 2050/24* (2013.01)

(58) Field of Classification Search
CPC ..... F02B 29/0443; F02B 29/0412; F01P 7/02; F01P 7/14; B60K 6/24; B60K 11/02
See application file for complete search history.

(56) References Cited

U.S. PATENT DOCUMENTS

| | | | |
|---|---|---|---|
| 6,607,142 B1 | 8/2003 | Boggs et al. | |
| 9,199,531 B2 * | 12/2015 | Hutchins | ................... F01P 3/20 |
| 9,649,909 B2 * | 5/2017 | Enomoto | .............. B60W 20/00 |
| 2020/0158003 A1 * | 5/2020 | Quix | ................... F02B 29/0456 |

FOREIGN PATENT DOCUMENTS

| | | |
|---|---|---|
| DE | 19755042 A1 | 6/1999 |
| DE | 102010001321 A1 | 8/2011 |
| DE | 202013100921 U1 | 5/2013 |
| DE | 102014207280 A1 | 10/2015 |
| DE | 102014226018 A1 | 6/2016 |
| FR | 2995014 A1 | 3/2014 |
| GB | 2541006 A | 2/2017 |
| JP | 2017155672 A * | 9/2017 |
| WO | 2014037641 A1 | 3/2014 |

* cited by examiner

*Primary Examiner* — Kevin A Lathers
(74) *Attorney, Agent, or Firm* — Geoffrey Brumbaugh; McCoy Russell LLP

(57) ABSTRACT

Methods and systems are provided for a cooling arrangement of a hybrid vehicle. In one example, a system comprises a high-temperature coolant circuit with a pressure line shaped to actuate an actuator of a pressure-actuated valve arranged in a low-temperature coolant circuit.

20 Claims, 4 Drawing Sheets

METHODS AND SYSTEMS FOR HIGH AND LOW TEMPERATURE COOLANT CIRCUITS

CROSS REFERENCE TO RELATED APPLICATION

The present application claims priority to German patent application No. 102018207011.3, filed on May 7, 2018. The entire contents of the above-listed application are hereby incorporated by reference for all purposes.

FIELD

The present description relates generally to coolant circuits for two different torque sources of a vehicle.

BACKGROUND/SUMMARY

In response to increasingly stringent emissions regulations, transportation devices, such as vehicles, are being fitted with additional torque sources outside of an engine. As an example, a powertrain of a hybrid vehicle may comprise an engine and an electric motor, wherein the engine and the electric motor may operate in combination or individually to propel the hybrid vehicle.

The torque sources of the hybrid vehicle may demand cooling at various times of operation. However, cooling may be prioritized to various portions of the hybrid vehicle based on its mode of operation. For example, if the electric motor is not active, it may not demand cooling. Additionally or alternatively, if the engine is not active, then it may not demand cooling. As such, hybrid vehicles may need complex cooling arrangements with instructions for operating various valves for adjusting coolant flows of different temperatures and pressures.

One example approach is shown by Hartinger et al. in DE102014226018. Therein, a low-temperature coolant circuit for an electric motor is separated from a high-temperature coolant circuit for an engine. Each of the coolant circuits comprise separate pumps and electronically actuated valves for adjusting coolant flow as desired. Another example approach is shown by Druckhammer et al. in DE102014207280. Therein, a valve for adjusting coolant flow is actuated via coolant pressing against its actuator.

However, the inventors have identified some issues with the approaches described above. For example, the arrangement shown by Hartinger is expensive to manufacture as each valve therein is electronically actuated, thereby demanding instructions programmed as code into memory of a controller along with desired electrical connections. Furthermore, electrical components may degrade over time due to dust and other contaminants infiltrating their electrical connections. The arrangement shown by Druckhammer fails to account for temperature differences between coolant circuits if it were to be arranged in a hybrid vehicle.

The inventors have identified the above-described issues and come up with a way to at least partially address them. In one example, the issues described above may be addressed by a system comprises a high-temperature coolant circuit comprising a coolant pump and a low-temperature coolant circuit comprising a pressure-actuated valve, the pressure-actuated valve shaped to adjust a coolant flow therethrough based on a pressure directly downstream of the coolant pump. In this way, a complexity of a cooling arrangement is reduced.

As one example, a pressure line couples a portion of the high-temperature coolant circuit downstream of the coolant pump with the pressure-actuated valve. The pressure line may direct coolant to an actuator of the pressure-actuated valve when the coolant pump is active, which may correspond to conditions where an engine is active. The coolant in the pressure line may force the actuator to a first position, which may adjust coolant flow in the low-temperature coolant circuit. While pressing against the actuator, the coolant in the pressure line does not mix with coolant in the pressure-actuated valve or in the low-temperature coolant circuit.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
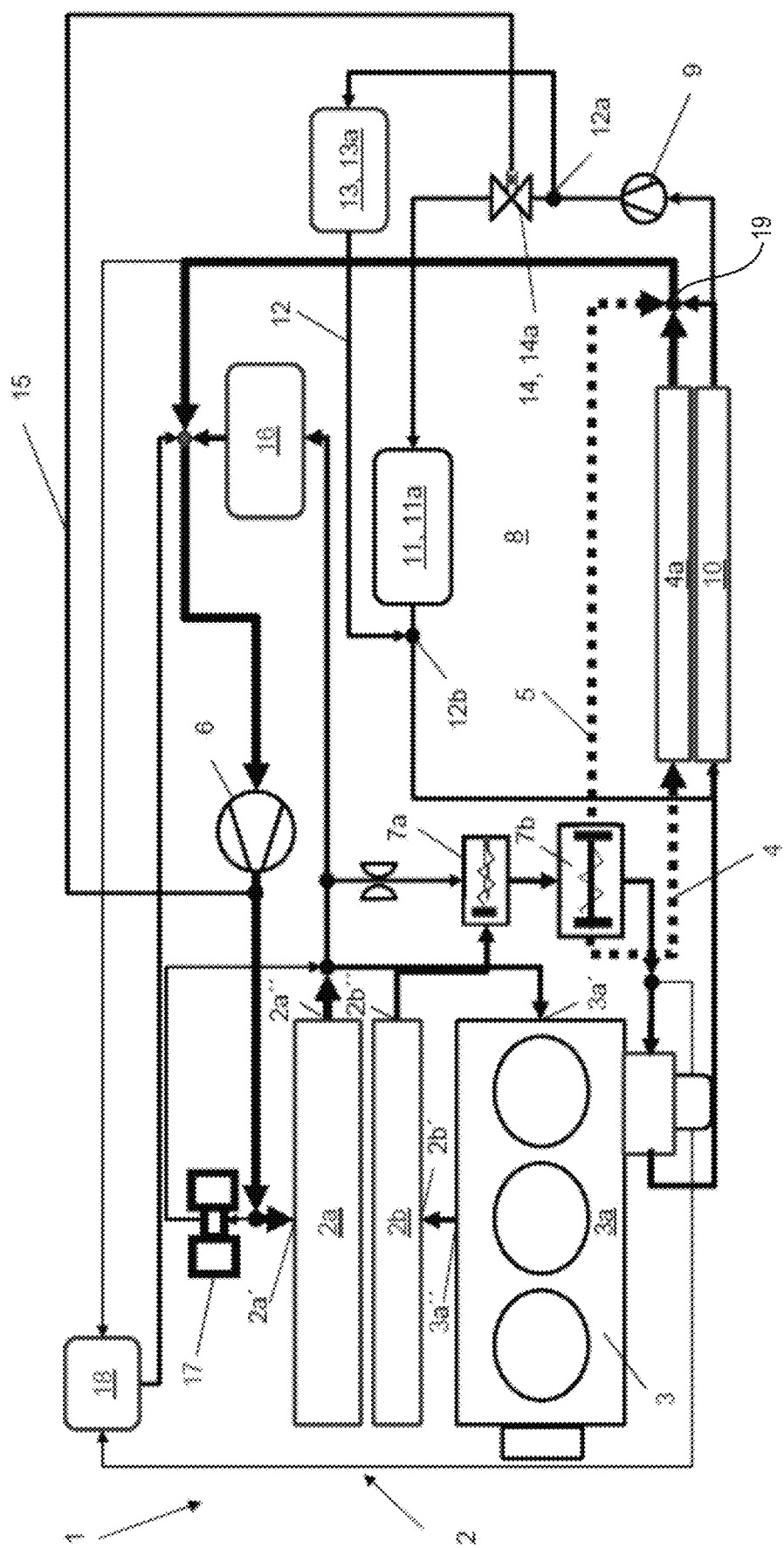
FIG. 1 schematically shows the coolant circuits of a first embodiment of the hybrid drive.
Figure 2:
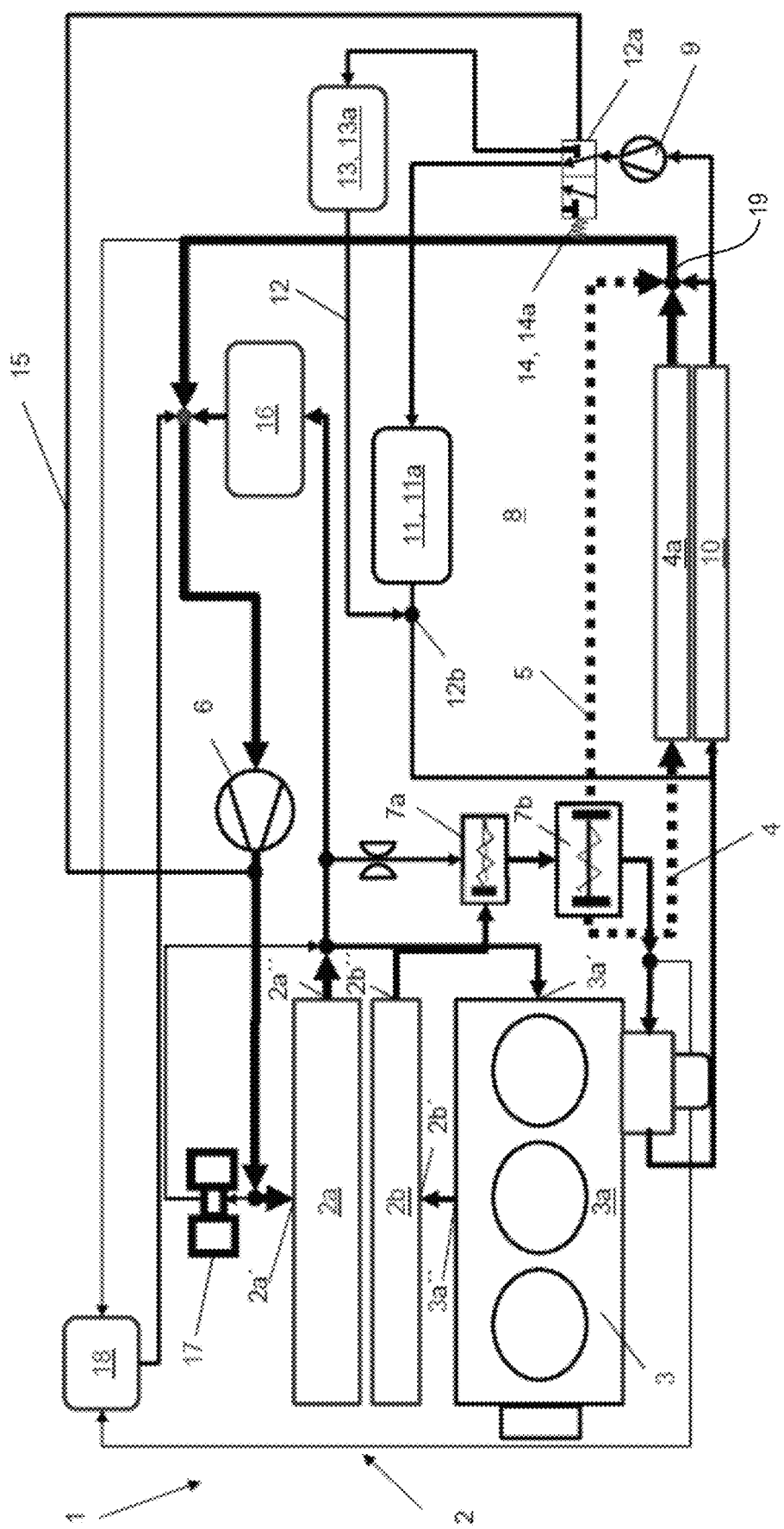
FIG. 2 schematically shows the coolant circuits of a second embodiment of the hybrid drive.
Figure 3:
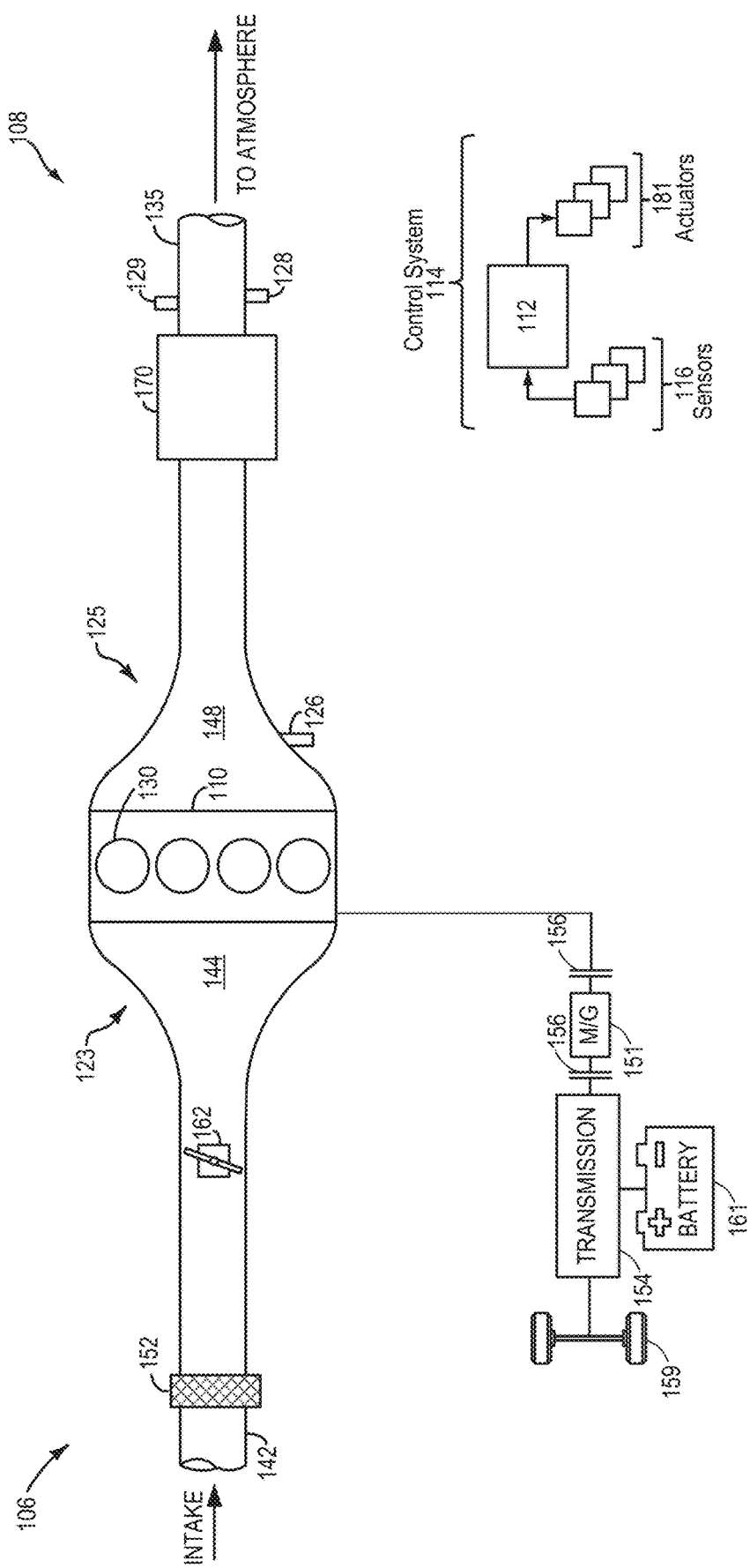
FIG. 3 illustrates an engine of a hybrid vehicle.
Figure 4:
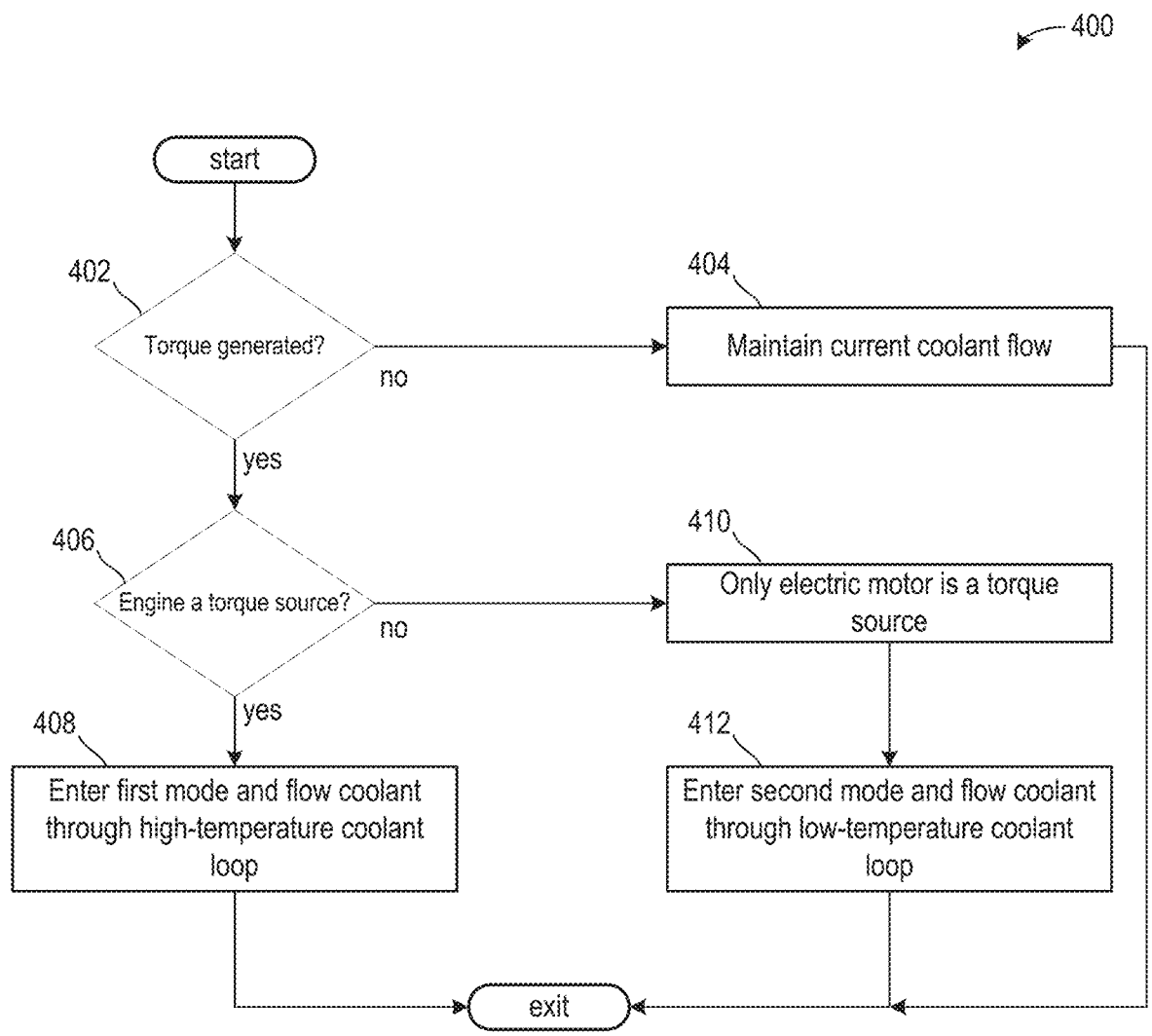
FIG. 4 illustrates a method for operating the pressure-actuated valve of the low-temperature coolant circuit.

The following description relates to systems and methods for separate coolant circuits for various torque sources of a vehicle. In the examples of FIGS. 1 and 2, a high temperature circuit and a low-temperature circuit are shown. An operating mode of the low-temperature circuit may be automatically adjusted based on a pressure in the high-temperature circuit without mixing coolant from the high-temperature circuit and the low-temperature circuit. An example of the engine is shown in FIG. 3. FIG. 4 illustrates an example method for adjusting operation of the low-temperature coolant circuit based on conditions of the high-temperature coolant circuit.

A hybrid drive of the abovementioned type is used for example as a motor vehicle drive. Within the context of the present disclosure, the expression internal combustion engine encompasses diesel engines and Otto-cycle engines and also hybrid internal combustion engines which utilize a hybrid combustion process.

Internal combustion engines have at least one cylinder head and the cylinder block which are connected to one another to shape the cylinders or combustion chambers.

During the charge exchange, the combustion gases are discharged via the outlet openings, and the charging of the combustion chamber with fresh mixture or fresh air takes place via the inlet openings of the cylinders. To control the charge exchange, in four-stroke engines, lifting valves as control elements may be utilized, which lifting valves perform an oscillating lifting movement during the operation of the internal combustion engine and open and close the inlet and outlet openings in this way. The valve actuating mechanism required for the movement of a valve, including the valve itself, is referred to as the valve drive.

The cylinder head serves to hold the control elements, and in the case of an overhead camshaft, to hold the valve drives in their entirety. In applied-ignition internal combustion engines, the desired ignition device may also be arranged in the cylinder head, and furthermore in the case of direct-injection internal combustion engines, the injection device may be arranged in the cylinder head.

The cylinder head of an internal combustion engine is a thermally and mechanically highly loaded component, wherein the demands on the cylinder head increase further. Furthermore, packaging constraints are increasing as it becomes more common to supercharge engines. On account of the more dense packaging in the engine bay and the increasing integration of parts and components into the cylinder head, for example the integration of the exhaust manifold, the thermal loading of the internal combustion engine and of the cylinder head is increased in particular, such that increased demands may be placed on the cooling system and measures are to be taken to reliably mitigate thermal overloading of the internal combustion engine.

It is possible for the cooling arrangement of an internal combustion engine to take the form of an air-type cooling arrangement or a liquid-type cooling arrangement. On account of the higher heat capacity of liquids, it is possible for significantly greater quantities of heat to be dissipated using a liquid-type cooling arrangement than is possible using an air-type cooling arrangement. Therefore, internal combustion engines according to the prior art are ever more frequently being equipped with a liquid-type cooling arrangement.

A liquid-cooled internal combustion engine is also part of the hybrid drive to which the present disclosure relates.

The formation of a liquid-type cooling arrangement generally necessitates that the at least one cylinder head be equipped with at least one coolant jacket, that is to say demands the provision of coolant ducts that lead through the cylinder head. The at least one coolant jacket is supplied with coolant via a supply opening, which coolant, after flowing through the cylinder head, exits the coolant jacket via a discharge opening. The heat may not first be conducted to the cylinder head surface in order to be dissipated, as is the case in an air-type cooling arrangement, but rather is discharged to the coolant already in the interior of the cylinder head. Here, the coolant is delivered via pump arranged in the coolant circuit, such that said coolant circulates. The heat which is discharged to the coolant is thereby discharged from the interior of the cylinder head via the discharge opening, and is extracted from the coolant again outside the cylinder head, for example via a heat exchanger and/or in some other way.

Like the cylinder head, the cylinder block may also be equipped with one or more coolant jackets. The cylinder head may be the thermally more highly loaded component because, by contrast to the cylinder block, the head is provided with exhaust-gas-conducting lines, and the combustion chamber walls which are integrated in the head are exposed to hot exhaust gas for longer than the cylinder barrels provided in the cylinder block. Furthermore, the cylinder head has a lower component mass than the block.

As coolant, use is generally made of a water-glycol mixture provided with additives. In relation to other coolants, water has the advantage that it is non-toxic, readily available and cheap, and furthermore has a very high heat capacity, for which reason water is suitable for the extraction and dissipation of very large amounts of heat, which is basically considered to be advantageous. The internal combustion engine of the present disclosure is liquid-cooled and has at least one liquid-cooled cylinder head and/or a liquid-cooled cylinder block.

To form a coolant circuit, the discharge opening from which the coolant is discharged is at least intermittently connectable to the supply opening which serves for the supply of coolant to the coolant jacket, for which purpose a line or multiple lines may be provided. These lines need not be lines in the actual sense but rather may also be integrated in certain sections into the cylinder head, the cylinder block or some other component. An example of such a line is a recirculation line in which a heat exchanger is arranged in order to extract heat from the coolant. In this context, at least connectable may describe that the discharge opening is either permanently connected to the supply opening via a line system, or these can be connected to one another in targeted fashion through the use of valves and/or shut-off elements.

It is not the aim and the purpose of a liquid-type cooling arrangement to extract the greatest possible amount of heat from the internal combustion engine under all operating conditions. Rather, control of the liquid-type cooling arrangement in a manner appropriate to requirements is desired. Said another way, the liquid-type cooling arrangement may be used to cool and/or heat portions of the internal combustion engine depending on one or more engine operating parameters.

To reduce frictional losses and thus the fuel consumption of an internal combustion engine, fast warming of the engine oil, in particular after a cold start, may be desired. Fast warming of the engine oil during the warm-up phase of the internal combustion engine may allow a correspondingly fast decrease in the viscosity of the oil and thus a reduction in friction and frictional losses, in particular in the bearings which are supplied with oil, for example the bearings of the crankshaft.

Fast warming of the engine oil in order to reduce frictional losses may be promoted via fast heating of the internal combustion engine itself, which in turn is assisted, that is to say forced, by virtue of as little heat as possible being extracted from the internal combustion engine during the warm-up phase.

In this respect, the warm-up phase of the internal combustion engine after a cold start is an example of an operating mode in which as little heat as possible, preferably no heat, should be extracted from the internal combustion engine.

Control of the liquid-type cooling arrangement in which the extraction of heat after a cold start is reduced for the purpose of fast heating of the internal combustion engine may be realized through the use of a temperature-dependently self-controlling valve, which may be known as a thermostat valve to those of ordinary skill in the art. A thermostat valve may comprise a temperature-reactive element which is impinged on by coolant, wherein a line which leads through the valve is blocked or opened up, to a greater or lesser extent, as a function of the coolant temperature at the element. In this way, it is for example possible for coolant to be recirculated from the outlet side to the inlet side of the cooling circuit via a bypass line which bypasses a heat exchanger arranged in a recirculation line.

Also known from the prior art are so-called no-flow strategies in which the coolant throughput through the cylinder head and/or through the cylinder block is stopped entirely in order that as little heat as possible is extracted from the internal combustion engine. A no-flow strategy of said type may likewise be realized via a thermostat valve; in some cases via a thermostat valve which is switchable in two-stage fashion, and which either permits or blocks the coolant flow.

In the case of an internal combustion engine with multiple coolant jackets, it may be advantageous to control the coolant jackets independently of one another.

Aside from the internal combustion engine, a hybrid drive may comprise an electric machine as a further torque source for the drive of the motor vehicle.

Here, either the electric machine or the internal combustion engine can be used for driving the vehicle. It is however generally also possible for the electric machine to simultaneously be used and operated as a drive in addition to the internal combustion engine. Then, both the internal combustion engine and the electric machine output power into the drivetrain.

In the development of drives for vehicles, it is constantly sought to minimize fuel consumption. Furthermore, a reduction of the pollutant emissions is sought in order to be able to comply with future limit values for pollutant emissions.

According to previous examples, electric drives may be used in vehicles, generally in combination with an internal combustion engine as a hybrid drive.

With regard to the reduction in fuel consumption or the reduction in pollutant emissions, this is advantageous only if the electric drive, in at least one operating range or characteristic map range, has a higher efficiency than the internal combustion engine and thus an advantage over the internal combustion engine, or the drive energy used for the electric drive originates from energy recovery on board the vehicle or has been generated from regenerative, that is to say renewable energy sources. Irrespective of this, the electric drive, as an emissions-free drive, is justified, or has its advantages, in urban traffic.

There are however further relevant reasons for the use of electric drives, for example the reduction in drive noise of a vehicle. The noise emissions of a motor vehicle, in particular the drive noises, have an adverse effect not only on the quality of life or well-being but in particular also on the health of the persons exposed to the noise, as a result of which a multiplicity of regulations have been enacted which specify the noise limit values to which need to be adhered.

Other torque sources for the driver of a motor vehicle also may demand cooling. For example, it may be desired to cool the housing of an electric machine or the power electronics electric machine, which basically comprises a battery or some other accumulator.

In this regard, incorporation into the engine cooling arrangement is not expedient, because the coolant of the engine cooling arrangement of a heated-up internal combustion engine in operation generally reaches temperatures of $T_{coolant} \geq 90°$ C., and thus may be unsuitable (e.g., too hot) for cooling the housing or the power electronics of an electric machine.

Rather, in the previous examples, a low-temperature cooling circuit of the internal combustion engine is utilized which is present in any case and in which at least one heat exchanger belonging to the internal combustion engine, for example a coolant-operated charge-air cooler, is already arranged. The coolant of a low-temperature cooling circuit may operate between temperatures of $T_{coolant} \leq 50°$ C. or $T_{coolant} \leq 40°$ C. or less.

Aside from the heat exchanger belonging to the internal combustion engine, it is readily possible for additional heat exchangers belonging to a further torque source to be arranged in a low-temperature cooling circuit, such as for example those mentioned above. By contrast, the incorporation of a charge-air cooler into the liquid-type cooling arrangement of the internal combustion engine is not expedient.

According to the previous examples, such heat exchangers belonging to the further torque source may be arranged in a bypass line which branches off from the original low-temperature cooling circuit, for bypassing purposes, and so as to form a first junction, upstream of the at least one heat exchanger belonging to the internal combustion engine, and which opens into the original low-temperature coolant circuit again downstream of the at least one heat exchanger belonging to the internal combustion engine.

In the case of a hybrid drive of the type mentioned in the introduction, generally either the internal combustion engine or the further torque source is used for the drive of the motor vehicle, such that it is not necessary for heat exchangers belonging to the internal combustion engine and to the further torque source and provided in the low-temperature cooling circuit to be operated, that is to say supplied with coolant, in parallel and simultaneously.

To control the coolant flows, according to the previous examples, a control element controlled via an engine controller is arranged in the low-temperature cooling circuit, which control element either permits or blocks, that is to say prevents, the coolant flow via the at least one heat exchanger belonging to the internal combustion engine.

An electronically controlled control element, which is actuated actively using the engine controller, is highly cumbersome and expensive.

In one embodiment, a hybrid drive comprises a liquid-cooled internal combustion engine with at least one-cylinder head and one cylinder block and further comprises a further torque source for the drive of a motor vehicle, in which the internal combustion engine is equipped with a liquid-type cooling arrangement, for which purpose the at least one-cylinder head and/or the cylinder block is equipped with at least one integrated coolant jacket which, at an inlet side, has a supply opening for the supply of coolant and, at the outlet side, has a discharge opening for the discharge of the coolant, to form a coolant circuit, the discharge opening is at least intermittently connectable to the supply opening, a pump for conveying the coolant in the cooling circuit is arranged upstream of the supply opening, and a low-temperature coolant circuit is provided, in which there are arranged a further pump for conveying coolant, a radiator, and at least one heat exchanger belonging to the internal combustion engine, a bypass line branching off, for bypassing purposes, and so as to form a first junction, upstream of the at least one heat exchanger belonging to the internal combustion engine, in which bypass line there is arranged at least one heat exchanger belonging to the further torque source. The hybrid drive may comprises where in the low-temperature cooling circuit, there is arranged a pressure-controlled control element which, in a first switching position, permits the coolant flow via the at least one heat exchanger belonging to the internal combustion engine and, in a second switching position, blocks the coolant flow via the at least one heat exchanger belonging to the internal combustion engine and permits the coolant flow via the at least one heat exchanger belonging to the further torque source.

In one example, additionally or alternatively, if the control element is in the first switching position, then it blocks the coolant flow via the at least one heat exchanger belonging to the further torque source.

According to the present disclosure, the low-temperature coolant circuit is equipped with a pressure-controlled control element which permits control of the coolant flows in the low-temperature coolant circuit in accordance with demand (e.g., based on an operation of the internal combustion engine and the further torque source).

The control element is a control element or valve which is actuated using coolant, that is to say hydraulically, and self-controlling and which assumes a switching position in a manner dependent on the pressure of the coolant in the coolant circuit of the liquid-type cooling arrangement of the internal combustion engine, that is to say of the engine cooling arrangement. Here, the control element is connected via a control line to a selected point of the coolant circuit such that the present pressure of the coolant at that point can act or acts on the control element.

In a first switching position, the control element permits the coolant flow via the at least one heat exchanger belonging to the internal combustion engine, but may block the coolant flow via the at least one heat exchanger belonging to the further torque source, whereby the latter heat exchanger is or remains deactivated. By contrast, in a second switching position, the control element permits the coolant flow via said at least one heat exchanger belonging to the further torque source. The at least one heat exchanger belonging to the further torque source is activated and used. At the same time, the control element, in the second switching position, blocks the coolant flow via the at least one heat exchanger belonging to the internal combustion engine.

If either the internal combustion engine or the further torque source of the hybrid drive is used for the drive of the motor vehicle, parallel and simultaneous operation of all of the heat exchangers arranged in the low-temperature cooling circuit is not necessary.

If only the internal combustion engine serves for the drive of the motor vehicle, a control element situated in the first switching position may enable that, although coolant is conducted through the at least one heat exchanger belonging to the internal combustion engine, a coolant flow through the at least one heat exchanger belonging to the further torque source is blocked.

By contrast, if only a further torque source serves for the drive of the motor vehicle when the internal combustion engine is not an operation, a control element situated in the second switching position allows that the at least one heat exchanger belonging to the internal combustion engine is or remains deactivated, whereas coolant flows and is conveyed through the at least one heat exchanger belonging to the further torque source.

Cumbersome and expensive control of the coolant flows using the engine controller of the internal combustion engine and a control element controllable via the engine controller is eliminated or rendered superfluous. That is to say, the pressure actuated control element is free of electrical connections and electronic actuators, such that the control element is only actuated via a sensed pressure.

Embodiments of the hybrid drive may comprise where the hybrid drive comprises a further torque source for the drive of the motor vehicle, an electric machine which outputs power into a drivetrain of the motor vehicle. The electric machine may then be used as an alternative torque source, that is to say instead of the internal combustion engine, but also so as to supplement, that is to say in addition to, the internal combustion engine.

If an electric machine is provided as a further torque source for the drive of the internal combustion engine, the electric machine may be used in order, as an activatable auxiliary drive, to satisfy a demanded increased power output when the internal combustion engine is in fired operation.

An increased power demand which cannot be satisfied or preferably is not satisfied by the internal combustion engine alone is then provided by the electric machine, which functions here as an activatable auxiliary drive.

In some cases, the electric machine may be used in order, as an activatable generator, to receive an excess of power provided by the internal combustion engine when the internal combustion engine is fired operation.

This method variant makes it possible for the internal combustion engine to be operated at a characteristic map point at which more power is provided than is demanded. This is advantageous for example if the selected characteristic map point is distinguished by high efficiency. The excess power can be received and utilized by the electric machine operated as a generator.

Embodiments of the method may comprise where the electric machine is used in order, as a generator, to receive power from the drive train in overrun operation when the internal combustion engine is not in fired operation, and to thus recover energy. Here, electric machine operated as a generator generates a braking torque.

If an electric machine is provided as a further torque source for the drive of the motor vehicle, embodiments of the hybrid drive may comprise where the electric machine is connected in terms of drive to the internal combustion engine. In this variant, the electric machine is permanently connected in terms of drive to the internal combustion engine, that is to say is non-separably connected to the internal combustion engine. Consequently, the electric machine cranks the internal combustion engine when the latter is in non-fired operation, for which reasons measures may be implemented with which the cranking torque can be reduced. It may be expedient here for the compression work of the internal combustion engine during the charge exchange to be reduced; for example via modified or suitable control timing of the valves.

If an electric machine is provided as a further torque source for the drive of the motor vehicle, embodiments of the hybrid drive are likewise advantageous in which the electric machine is connectable in terms of drive to the internal combustion engine via a clutch.

If the electric machine is used for the drive of the motor vehicle, it may be desired for the electric machine to be separated from the non-fired internal combustion engine by opening the clutch, in order to reduce the cranking torque.

If an electric machine is provided as a further torque source for the driver of the motor vehicle, embodiments may comprise where the electric machine is used as a starting device for starting the internal combustion engine. Here, use is made of the fact that the electric machine is connected in terms of drive, or is at least connectable in terms of drive via a clutch, to the internal combustion engine. That is to say, the electric machine is basically capable of positively setting the crankshaft in rotation during the starting process.

If an electric machine is provided as a further torque source for the drive of the motor vehicle, embodiments of the hybrid drive may comprise where the at least one heat exchanger belonging to the further torque source serves for cooling the electric machine. The housing of the electric machine may for example have a cavity through which coolant is conducted for cooling the electric machine.

If an electric machine is provided as a further torque source for the drive of the motor vehicle, embodiments of the hybrid drive may comprise where the at least one heat exchanger belonging to the further torque source serves for cooling power electronics of the electric machine. The power electronics of an electric machine basically comprises a battery or some other accumulator. An accumulator must generally be protected against overheating.

Embodiments of the hybrid drive may comprise where the hybrid drive comprises, as further torque source for the drive of the motor vehicle, a fuel cell which outputs power into a drivetrain of the motor vehicle.

In this context, embodiments of the hybrid drive may comprise where the at least one heat exchanger belonging to the further torque source serves for cooling the fuel cell.

In this context, embodiments of the hybrid drive may comprise where the at least one heat exchanger belonging to the further torque source serves for cooling an assembly belonging to the fuel cell. A fuel cell drive may for example include, aside from the fuel cell itself, a compressor and/or expander as an assembly.

Embodiments of the hybrid drive may comprise where the at least one heat exchanger belonging to the internal combustion engine is a charge-air cooler.

Internal combustion engines are ever more commonly supercharged. Supercharging is primarily a method for increasing power in which the air needed for the combustion process in the engine is compressed, as a result of which a greater air mass can be fed to each cylinder in each working cycle. In this way, the fuel mass introduced and therefore the mean pressure can be increased.

Supercharging is a suitable means for increasing the power of an internal combustion engine while maintaining an unchanged swept volume, or for reducing the swept volume while maintaining the same power. In all cases, supercharging leads to an increase in volumetric power output and a more expedient power-to-weight ratio. If the swept volume is reduced, it is thus possible to shift the load collective toward higher loads, at which the specific fuel consumption is lower.

The fresh air is compressed before entering the cylinders, whereby supercharging is realized. A charge-air cooler cools the compressed charge air before it enters the cylinders. In this way, the temperature is lowered, and thus the density of the charge air is increased, such that the cooler also contributes to improved charging of the cylinders, that is to say to a greater air mass.

Embodiments of the hybrid drive may comprise where the at least one heat exchanger belonging to the internal combustion engine is an oil cooler.

With regard to the reduction of the friction losses in the bearings, a higher oil temperature is duly sought. Other consumers however have different demands on the oil, in particular on the oil temperature, for which reason a coolant-operated oil cooler may be desired or advantageous for lowering the oil temperature.

The oil spray cooling arrangement of a piston, which sprays the piston crown with engine oil for the purposes of cooling, desires engine oil that is cool, that is to say engine oil of a lower temperature, in order to be able to extract the greatest possible amount of heat from the piston.

A hydraulically actuatable camshaft adjuster likewise prefers engine oil which is less warm, that is to say an engine oil at a less high-temperature, the viscosity of which is not too low. In this way, excessive leakage, which is also dependent on the viscosity of the hydraulic liquid, can be avoided.

Embodiments of the hybrid drive may comprise where the at least one heat exchanger belonging to the internal combustion engine belongs to an air-conditioning system of the motor vehicle. In some cases, the air-conditioning system comprises a coolant-operated condenser, the purpose of which is to extract heat from a refrigerant. It may be desired for fresh air which is to be supplied to the vehicle interior compartment to have heat extracted from it beforehand using a coolant-operated heat exchanger.

Embodiments of the hybrid drive may comprise where the discharge opening is at least intermittently connectable to the associated supply opening via a recirculation line in which a heat exchanger is arranged.

Heat can be extracted from the intensely heated coolant of the engine cooling arrangement, which in the case of an internal combustion engine in operation may reach temperatures above 90° C., using the heat exchanger in the recirculation line, before said coolant is supplied via the supply opening to the associated coolant jacket again.

After a cold start of the internal combustion engine, control of the coolant flow is recommended in the case of which the heat exchanger is bypassed via a bypass line, such that the coolant is recirculated from the outlet side to the inlet side of the cooling circuit without flowing through the heat exchanger.

Embodiments of the hybrid drive may comprise where the pressure-controlled control element is connected to the coolant circuit via a coolant-conducting control line.

In this context, embodiments of the hybrid drive may comprise where the pressure-controlled control element is connected to the coolant circuit downstream of the pump via the coolant-conducting control line.

The pressure of the coolant in the coolant circuit of the engine cooling arrangement varies in particular in a manner dependent on the operating state of the internal combustion engine. When the internal combustion engine is in operation, the pressure in the coolant downstream of the pump increases, or is relatively high. By contrast, if the internal combustion engine is shut down, that is to say is no longer fired or is no longer operated, the pressure downstream of the pump falls significantly. In this respect, the level of the present pressure downstream of the pump is an indicator of whether or not the internal combustion engine is being used for the driver of the motor vehicle.

When the internal combustion engine is in operation, the control element is, using the coolant or the relatively high coolant pressure, moved into the first switching position or held in the first switching position, such that the control element permits the coolant flow via the at least one heat exchanger belonging to the internal combustion engine and preferably blocks the coolant flow via the at least one heat exchanger belonging to the further torque source.

When the internal combustion engine is not in operation, the control element is, using the coolant or the relatively low coolant pressure, moved into the second switching position or held in the second switching position, such that the control element blocks the coolant flow via the at least one heat exchanger belonging to the internal combustion engine and permits the coolant flow via the at least one heat exchanger belonging to the further torque source.

Embodiments of the hybrid drive may comprise where the pressure-controlled control element is arranged between the at least one heat exchanger belonging to the internal combustion engine and the first junction.

Embodiments of the hybrid drive may however also be advantageous in which the pressure-controlled control element is arranged in the bypass line.

In both of the above embodiments, the control element may permit only the coolant flow via the at least one heat exchanger belonging to the internal combustion engine or via the at least one heat exchanger belonging to the further torque source, but may not actively block the respective other at least one heat exchanger. Then, the coolant flow through the at least one non-blocked heat exchanger is determined substantially by the relevant flow resistances in the low-temperature cooling circuit.

In particular, embodiments of the hybrid drive may comprise where the pressure-controlled control element is arranged at the first junction.

Here, embodiments of the hybrid drive may comprise where the pressure-controlled control element is a 3-2-way valve which has three ports and two switching positions.

A 3-2-way valve is distinguished by the fact that, in the first switching position, not only is the coolant flow via the at least one heat exchanger belonging to the internal combustion engine permitted, but also, the coolant flow via the at least one heat exchanger belonging to the further torque source is blocked.

Furthermore, in the second switching position, not only is the coolant flow via the at least one heat exchanger belonging to the internal combustion engine blocked, but also, the coolant flow via the at least one heat exchanger belonging to the further torque source is permitted.

Embodiments of the hybrid drive may comprise where the bypass line opens and again, so as to form a second junction, downstream of the at least one heat exchanger belonging to the internal combustion engine.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it schematically shows the coolant circuits of a first embodiment of a hybrid drive which, aside from a liquid-cooled internal combustion engine 1, comprises an electric machine as a further torque source for the driver of the motor vehicle, which electric machine can output power into a drivetrain of the motor vehicle.

To form a liquid-type cooling arrangement, the internal combustion engine 1 comprises a liquid-cooled cylinder head 2 and a liquid-cooled cylinder block 3.

The liquid-cooled cylinder head 2 has two integrated, mutually separate coolant jackets 2a, 2b, wherein the first integrated coolant jacket 2a, which is arranged at an outlet side, has a supply opening 2a' at the inlet side for the feed of coolant and has a discharge opening 2a" at the outlet side for the discharge of the coolant. The second integrated coolant jacket 2b, which is arranged at an inlet side, is fed with coolant via the cylinder block 3, and has a supply opening 2b' at the inlet side and has a discharge opening 2b" at the outlet side. The second coolant jacket 2b cylinder block 2 is connected to a coolant jacket 3a which is integrated in the block 3 and which has a supply opening 3a' at the inlet side for the feed of coolant and has a discharge opening 3a" at the outlet side for the discharge of the coolant.

The discharge openings 2a", 2b" of the first and second coolant jacket 2a, 2b of the cylinder head 2 are connected to a first thermostat valve 7a, which, in the context of a no-flow strategy, completely blocks the coolant flow through the cylinder block 3 and the second coolant jacket 2b of the cylinder head 2 if the coolant temperature is too low. Furthermore, the discharge opening 2a" of the first coolant jacket 2a of the cylinder head 2 is connected to a vehicle interior compartment heating arrangement 16. After a cold start, the outlet side of the cylinder head 2 heats up more quickly, and can thus provide heated coolant to the vehicle interior compartment heating arrangements 16 at an early point in time.

Upstream of the supply opening 2a' of the first coolant jacket 2a of the cylinder head 2, there is provided a pump 6 for conveying the coolant in the coolant circuit of the engine cooling arrangement. The pump 6 conveys coolant to the first coolant jacket 2a of the cylinder head 2 but also to an exhaust-gas turbocharger 17 cooled via coolant.

To form a coolant circuit, the discharge openings 2a", 2b", 3a" are fluidically at least connectable to the supply openings 2a', 2b', 3a'.

The discharge openings 2a", 2b", 3a" are connectable to the pump 6 and to the supply openings 2a', 2b', 3a' via a recirculation line 4, in which a heat exchanger 4a is arranged, and/or via a bypass line 5 which bypasses the heat exchanger 4a. At that location in the circuit at which the bypass line 5 branches off from the recirculation line 4, there is arranged a second thermostat valve 7b which automatically performs the splitting of the coolant flow between the two lines 4, 5.

A ventilation vessel 18 and/or degas bottle 18 may be arranged at a geodetically high location serves for the ventilation of the engine cooling arrangement. The engine cooling arrangement may be interchangeably referred to as a high-temperature coolant circuit, wherein the high-temperature coolant circuit comprises the first coolant jacket 2a, the heating arrangement 16, the first pump 6, and the turbocharger 17.

Aside from the engine cooling arrangement, a low-temperature coolant circuit 8 is provided, in which there are arranged a further pump 9 for conveying coolant, a radiator 10, and a heat exchanger 11 belonging to the internal combustion engine 1, specifically a charge-air cooler 11a.

A bypass line 12 branches off, so as to form a first junction 12a, upstream of the charge-air cooler 11a, which bypass line opens in again, so as to form a second junction 12b, downstream of the charge-air cooler 11a and serves for bypassing the charge-air cooler 11a. A heat exchanger 13, 13a belonging to a further torque source is arranged in the bypass line 12, wherein an electric machine may be provided as the further torque source for the drive of the motor vehicle.

A pressure-controlled control element 14, in the present case a valve 14a which is switchable in two-stage fashion, is arranged in the low-temperature coolant circuit 8, specifically between the charge-air cooler 11a and the first junction 12a.

The pressure-controlled valve 14a is connected, via a coolant-conducting control line 15, to the coolant circuit downstream of the pump 6.

In a first switching position, the valve 14a permits the coolant flow via the charge-air cooler 11a. In a second switching position, the valve 14a blocks this coolant flow through the charge-air cooler 11a. All that remains for the coolant is the path through the heat exchanger 13a belonging to the electric machine via bypass line 12, which is open in an unchanged manner.

When the internal combustion engine 1 is in operation, the valve 14a is situated in the first switching position owing to a relatively high coolant pressure downstream of the pump 6, such that the coolant can flow through the charge-air cooler 11a and through the heat exchanger 13a belonging to the electric machine.

When the internal combustion engine 1 is not in operation, the valve 14a is moved into and held in the second switching position owing to a relatively low coolant pressure, such that the coolant can no longer flow through the charge-air cooler 11a, but rather can only flow through the heat exchanger 13a belonging to the electric machine.

Turning now to FIG. 2, it schematically shows the coolant circuits of a second embodiment of the hybrid drive. It is sought to explain only the differences in relation to the first embodiment illustrated in FIG. 1, for which reason reference is otherwise made to FIG. 1. The same reference designations have been used for the same components.

By contrast to the embodiment illustrated in FIG. 1, in which a valve 14a which is switchable in two-stage fashion is arranged between the charge-air cooler 11a and the first junction 12a, the embodiment illustrated in FIG. 2 has a pressure-controlled 3-2-way valve 14b, which is arranged at the first junction 12a.

In the first switching position illustrated in FIG. 2, the 3-2-way valve 14b permits the coolant flow via the charge-air cooler 11a and blocks the coolant flow through the heat exchanger 13a belonging to the electric machine via a bypass line 12. In the second switching position, the coolant flow through the charge-air cooler 11a is blocked, and the coolant flow through the heat exchanger 13a belonging to the electric machine is permitted.

Said another way, FIGS. 1 and 2 illustrate an arrangement for the internal combustion engine 1 arranged in a hybrid vehicle, such as a hybrid vehicle system 106 of FIG. 3. The engine comprises a cylinder head 2 comprising a first coolant jacket 2a and a second coolant jacket 2b. The first coolant jacket 2a and the second coolant jacket 2b may be fluidly separated from one another.

The first coolant jacket 2a, which is arranged on an exhaust side of the cylinder head 2, may be fluidly coupled to the heating arrangement 16. The heating arrangement 16 may be configured to heat an interior cabin of a vehicle. By fluidly coupling the heating arrangement 16 to the first coolant jacket 2a, heating of the vehicle interior may occur more rapidly during a cold-start.

Downstream of the heating arrangement 16 there is a first pump 6, which may be mechanically operated when the engine 1 is combusting. The first pump 6 may be configured to flow coolant to each of the first coolant jacket 2a and the turbocharger 17.

A pressure line 15 and/or the coolant-conducting control line 15 is connected to each of the pressure-controlled control element 14 (e.g., the valve 14a) and a point directly downstream of the pump 6. The pressure line 15 may communicate a pressure to the valve 14a. In this way, the valve 14a may be actuated in response to a pressure directly downstream of the pump 6.

The pressure line 15 may conduct coolant from the point to the valve 14a. The coolant may press against an actuator of the valve 14a without flowing through the valve 14a and mixing with coolant in the low-temperature coolant loop. That is to say, the coolant from the pressure line 15 may adjust a position of the valve 14a without flowing to either of the charge-air cooler 11a and/or the heat exchanger 13a. In this way, the valve 14a may be actuated via a coolant flow without allowing the coolant flow by which it is actuated to flow through any of its outlet ports.

During the first mode, where the engine is active, resulting in the first pump 6 being active, coolant flows from the pump to the first coolant jacket 2a and the turbocharger 17, via a high-temperature coolant circuit. Coolant may additionally flow from the second thermostat valve 7b to an engine heat exchanger 4a if a coolant temperature is greater than a threshold (e.g., 90° C.). If the coolant temperature is less than the threshold, then the coolant may bypass the heat exchanger 4a, where the coolant is redirected to the pump 6. The first thermostat valve 7a may be based on a cold-start temperature, wherein the first thermostat valve 7a remains closed and keeps coolant in the high-temperature coolant circuit until it is sufficiently warmed up and the cold-start is complete.

The first mode may further comprise where coolant flows through the low-temperature coolant circuit 8. During the first mode, coolant in the pressure line 15 may press against an actuator of the valve 14a such that coolant flow in the low-temperature coolant circuit 8 is blocked from flowing to the electric machine heat exchanger 13a. Thus, coolant in the low-temperature coolant circuit 8 may flow through the radiator 10, to the second pump 9, through the valve 14a and to the charge-air cooler 11a. In this way, coolant flow in the low-temperature coolant circuit 8 may be adjusted based on a coolant pressure downstream of the first pump 6 without mixing with coolant from downstream of the first pump 6. That is to say, the first pump 6 may not directly conduct coolant to the low-temperature coolant circuit 8. The first pump 6 only conducts coolant directly to the first coolant jacket 2a, the turbocharger 17, and the pressure line 15, the pressure line 15 being hermetically sealed from outlet ports of the valve 14a.

During a second mode, the first pump 6 is deactivated and the engine is off. Coolant may not be conducted in the pressure line 15. As such, coolant in the low-temperature coolant circuit 8 may flow to the electric motor heat exchanger 13a. This may occur due to coolant no longer pressing against the actuator of the valve 14a, thereby allowing the actuator to return to a resting position, which may seal an outlet port corresponding to the charge-air cooler 11a and open an outlet port corresponding to the electric motor heat exchanger 13a. In this way, the second mode comprises flowing coolant to only the electric motor heat exchanger 13a and not to the engine heat exchanger 11a.

Due to the inactivity of the first pump 6, coolant may not flow to the turbocharger 17 and to the first coolant jacket 2a.

Upon reactivation of the engine 1, the first pump 6 may begin to draw coolant, wherein coolant from the low-temperature coolant circuit 8 may be drawn from a junction 19 and into the high-temperature coolant circuit via the first pump 6. By doing this, coolant may then flow through the pressure line 15 to adjust the valve 14a to block coolant flow to the electric motor heat exchanger 13a and enter the first mode.

FIG. 3 shows a schematic depiction of a hybrid vehicle system 106 that can derive propulsion power from engine system 108 and/or an on-board energy storage device. An energy conversion device, such as a generator, may be operated to absorb energy from vehicle motion and/or engine operation, and then convert the absorbed energy to an energy form suitable for storage by the energy storage device.

Engine system 108 may include an engine 110 having a plurality of cylinders 130. Engine 110 includes an engine intake 123 and an engine exhaust 125. Engine intake 123 includes an air intake throttle 162 fluidly coupled to the engine intake manifold 144 via an intake passage 142. Air may enter intake passage 142 via air filter 152. Engine exhaust 125 includes an exhaust manifold 148 leading to an exhaust passage 135 that routes exhaust gas to the atmosphere. Engine exhaust 125 may include one or more emission control devices 170 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 108 is a boosted engine system, the engine system may further include a boosting device, such as a turbocharger (not shown).

Vehicle system 106 may further include control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 106. As another example, the actuators may include the throttle 162.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 106 comprises multiple sources of torque available to one or more vehicle wheels 159. In other examples, vehicle 106 is a conventional vehicle with only an engine, or an electric vehicle with only electric machine(s). In the example shown, vehicle 106 includes engine 110 and an electric machine 151. Electric machine 151 may be a motor or a motor/generator. A crankshaft of engine 110 and electric machine 151 may be connected via a transmission 154 to vehicle wheels 159 when one or more clutches 156 are engaged. In the depicted example, a first clutch 156 is provided between a crankshaft and the electric machine 151, and a second clutch 156 is provided between electric machine 151 and transmission 154. Controller 112 may send a signal to an actuator of each clutch 156 to engage or disengage the clutch, so as to connect or disconnect crankshaft from electric machine 151 and the components connected thereto, and/or connect or disconnect electric machine 151 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 151 receives electrical power from a traction battery 161 to provide torque to vehicle wheels 159. Electric machine 151 may also be operated as a generator to provide electrical power to charge battery 161, for example during a braking operation.

Turning now to FIG. 4, it shows a method 400 for adjusting the pressure-controlled control element (e.g., pressure-controlled control element 14 of FIGS. 1 and 2. The method 400 begins at 402, which includes determining if torque is generated. Torque may be generated if the vehicle is moving at constant speed or accelerating. If torque is not being generated, then the method 400 proceeds to 404 to maintain a current coolant flow. The current coolant flow may be based on a previous vehicle operating condition where torque was being generated. For example, if a vehicle is currently decelerating and torque is not being generated, then the coolant flow may be based on a torque source prior to the braking. For example, if the engine was a torque source prior to braking, then coolant flow may have been in a first mode and the first mode may be maintained through the braking. If the engine was not a torque source prior to braking, then the coolant flow may have been in a second mode and the second mode may be maintained through the braking. Additionally or alternatively, the vehicle may be off and coolant flow may be stagnant, neither in the first or second modes.

If torque is being generated, then the method 400 proceeds to 406 to determine if the engine is a torque source. The engine may be a torque source if the engine provides some or all of a power demand. As such, the engine may be a torque source during hybrid operation and engine-only operation. If the engine is a torque source, then the method 400 proceeds to 408 to enter the first mode. The first mode comprises flowing coolant through only the high-temperature coolant loop and not the low-temperature coolant loop. The pressure downstream of a pump (e.g., pump 6 of FIGS. 1 and 2) may be relayed to the control element (e.g., control element 14 of FIGS. 1 and 2), wherein the pressure may press against an actuator of the control element to select the first mode.

If the engine is not a torque source, then the method 400 proceeds to 410, which includes only the electric motor being used as a torque source. The method 400 proceeds to 412, which includes entering the second mode and flowing coolant through the low-temperature coolant loop. The second mode may comprise the control element actuating to a second position due to an absence of pressure from downstream of the pump, wherein the second mode further comprise flowing coolant to a second heat exchanger (e.g., further heat exchanger 13).

In this way, a complexity of a cooling system for a hybrid vehicle may be reduced. The technical effect of adjusting a valve of a low-temperature coolant circuit via coolant from a high-pressure coolant circuit is to decrease manufacturing costs and decrease a system complexity.

In another representation, a hybrid drive comprising a liquid-cooled internal combustion engine with at least one cylinder head and one cylinder block and comprising a further torque source for the drive of a motor vehicle, in which the internal combustion engine is equipped with a liquid-type cooling arrangement, for which purpose the at least one cylinder head and/or the cylinder block is equipped with at least one integrated coolant jacket which, at an inlet side, has a supply opening for the supply of coolant and, at the outlet side, has a discharge opening for the discharge of the coolant, to form a coolant circuit, the discharge opening is at least intermittently connectable to the supply opening, a pump for conveying the coolant in the cooling circuit is arranged upstream of the supply opening, and a low-temperature coolant circuit is provided, in which there are arranged a further pump for conveying coolant, a radiator, and at least one heat exchanger belonging to the internal combustion engine, a bypass line branching off, for bypassing purposes, and so as to form a first junction, upstream of the at least one heat exchanger belonging to the internal combustion engine, in which bypass line there is arranged at least one heat exchanger belonging to the further torque source, wherein, in the low-temperature cooling circuit, there is arranged a pressure-controlled control element which, in a first switching position, permits the coolant flow via the at least one heat exchanger belonging to the internal combustion engine and, in a second switching position, blocks the coolant flow via the at least one heat exchanger belonging to the internal combustion engine and permits the coolant flow via the at least one heat exchanger belonging to the further torque source.

A first example of the hybrid drive further comprises where the control element, in the first switching position, blocks the coolant flow via the at least one heat exchanger belonging to the further torque source.

A second example of the hybrid drive, including any of the previous examples comprises, as further torque source for the drive of the motor vehicle, an electric machine which outputs power into a drivetrain of the motor vehicle.

A third example of the hybrid drive, including one or more of any of the previous examples, further comprises where the electric machine is connected in terms of drive to the internal combustion engine.

A fourth example of the hybrid drive, including one or more of any of the previous examples, further comprises where the electric machine is connectable in terms of drive to the internal combustion engine via a clutch.

A fifth example of the hybrid drive, including one or more of any of the previous examples, further comprises where the at least one heat exchanger belonging to the further torque source serves for cooling the electric machine.

A sixth example of the hybrid drive, including one or more of any of the previous examples, further comprises where the at least one heat exchanger belonging to the further torque source serves for cooling power electronics of the electric machine.

A seventh example of the hybrid drive, including one or more of any of the previous examples, further comprises whereas further torque source for the drive of the motor vehicle, a fuel cell which outputs power into a drivetrain of the motor vehicle.

An eighth example of the hybrid drive, including one or more of any of the previous examples, further comprises where the at least one heat exchanger belonging to the further torque source serves for cooling the fuel cell.

A ninth example of the hybrid drive, including one or more of any of the previous examples, further comprises where the at least one heat exchanger belonging to the further torque source serves for cooling an assembly belonging to the fuel cell.

A tenth example of the hybrid drive, including one or more of any of the previous examples, further comprises where the at least one heat exchanger belonging to the internal combustion engine is a charge-air cooler.

An eleventh example of the hybrid drive, including one or more of any of the previous examples, further comprises where the at least one heat exchanger belonging to the internal combustion engine is an oil cooler.

A twelfth example of the hybrid drive, including one or more of any of the previous examples, further comprises where the at least one heat exchanger belonging to the internal combustion engine belongs to an air-conditioning system of the motor vehicle.

A thirteenth example of the hybrid drive, including one or more of any of the previous examples, further comprises where the discharge opening is at least intermittently connectable to the associated supply opening via a recirculation line in which a heat exchanger is arranged.

A fourteenth example of the hybrid drive, including one or more of any of the previous examples, further comprises where the pressure-controlled control element is connected to the coolant circuit via a coolant-conducting control line.

A fifteenth example of the hybrid drive, including one or more of any of the previous examples, further comprises where the pressure-controlled control element is connected to the coolant circuit downstream of the pump via the coolant-conducting control line.

A sixteenth example of the hybrid drive, including one or more of any of the previous examples, further comprises where the pressure-controlled control element is arranged between the at least one heat exchanger belonging to the internal combustion engine and the first junction.

A seventeenth example of the hybrid drive, including one or more of any of the previous examples, further comprises where the pressure-controlled control element is arranged in the bypass line.

An eighteenth example of the hybrid drive, including one or more of any of the previous examples, further comprises where the pressure-controlled control element is arranged at the first junction.

A nineteenth example of the hybrid drive, including one or more of any of the previous examples, further comprises where the pressure-controlled control element is a 3-2-way valve which has three ports and two switching positions.

A twentieth example of the hybrid drive, including one or more of any of the previous examples, further comprises where the bypass line opens in again, so as to form a second junction, downstream of the at least one heat exchanger belonging to the internal combustion engine.

An embodiment of a system comprises a high-temperature coolant circuit comprising a coolant pump and a low-temperature coolant circuit comprising a pressure-actuated valve, the pressure-actuated valve shaped to adjust a coolant flow therethrough based on a pressure directly downstream of the coolant pump.

A first example of the system further includes where a pressure line coupling a portion of the high-temperature coolant circuit to the pressure-actuated valve, wherein the portion is directly downstream of the coolant pump.

A second example of the system, optionally including the first example, further includes where the pressure line is fluidly sealed from each of the outlet ports of the pressure-actuated valve.

A third example of the system, optionally including one or more of any of the above examples, further includes where coolant in the pressure line does not enter the low-temperature coolant circuit.

A fourth example of the system, optionally including one or more of any of the above examples, further includes where the coolant pump is fluidly coupled to a first cylinder head coolant jacket and a turbocharger, the first cylinder head coolant jacket being arranged on an exhaust side of a cylinder head adjacent to a second cylinder head coolant jacket arranged on an intake side of the cylinder head.

A fifth example of the system, optionally including one or more of any of the above examples, further includes where the second cylinder head coolant jacket receives coolant from a cylinder block coolant jacket.

A sixth example of the system, optionally including one or more of any of the above examples, further includes where the low-temperature coolant circuit comprises a first heat exchanger for an engine and a second heat exchanger for an additional torque device.

A seventh example of the system, optionally including one or more of any of the above examples, further includes where a thermostat valve adjusts coolant flow to the first heat exchanger and where the pressure-actuated valve adjusts coolant flow to the second heat exchanger.

An eighth example of the system, optionally including one or more of any of the above examples, further includes where a charge-air cooler in the low-temperature coolant circuit, wherein the pressure-actuated valve directs coolant in the low-temperature coolant circuit to the charge-air cooler and not to the second heat exchanger when the coolant pump is active.

A ninth example of the system, optionally including one or more of any of the above examples, further includes where the pressure-actuated valve directs coolant in the low-temperature coolant circuit to the second heat exchanger and not to the charge-air cooler when the coolant pump is deactivated.

A tenth example of the system, optionally including one or more of any of the above examples, further includes where the coolant pump is active when the engine is active, wherein a position of the pressure-actuated valve is adjusted via coolant directed from the coolant pump to an actuator of the pressure-actuated valve without flowing the coolant directed from the coolant pump through an outlet port of the pressure-actuated valve.

An embodiment of a hybrid vehicle comprises a high-temperature coolant loop and a low-temperature coolant loop, wherein the high-temperature coolant loop comprises a first coolant pump, a cylinder head coolant jacket, a turbocharger, and a cabin heating arrangement, wherein the low-temperature coolant loop comprises a first heat exchanger for a first torque device, a charge-air cooler, a radiator, a second coolant pump, a pressure-actuated valve, and a second heat exchanger for a second torque device and a pressure line coupling a portion of the high-temperature coolant loop between the first coolant pump and the cylinder head coolant jacket to an actuator of the pressure-actuated valve, wherein coolant in the pressure line does not mix with coolant in the low-temperature coolant loop.

A first example of the hybrid vehicle further comprises where the first torque device is an engine, wherein the second torque device is an electric motor or a fuel cell.

A second example of the hybrid vehicle, optionally including the first example, further comprises where the actuator is actuated to a first position when the first coolant pump is active and coolant is in the pressure line, wherein the first position blocks coolant from flowing to the second heat exchanger while allowing coolant to flow to the charge-air cooler.

A third example of the hybrid vehicle, optionally including one or more of any of the above examples further comprises where the actuator is actuated to a second position when the first coolant pump is deactivated and coolant is not in the pressure line, wherein the second position allows coolant to flow to the second heat exchanger while blocking coolant from flowing to the charge-air cooler.

A fourth example of the hybrid vehicle, optionally including one or more of any of the above examples further comprises where the first coolant pump is active whenever the engine is active.

A fifth example of the hybrid vehicle, optionally including one or more of any of the above examples further comprises where coolant flow to the first heat exchanger is adjusted via a thermostat valve.

A sixth example of the hybrid vehicle, optionally including one or more of any of the above examples further comprises where the second coolant pump is arranged upstream of the pressure actuated valve.

An embodiment of a hybrid vehicle cooling arrangement, comprising a high-temperature coolant loop comprising a first coolant pump, a cylinder head coolant jacket of an engine, a turbocharger, and a cabin heating arrangement, a low-temperature coolant loop comprising a first heat exchanger for the engine, a charge-air cooler, a radiator, a second coolant pump, a pressure-actuated valve, and a second heat exchanger for an additional torque device other than the engine, and a pressure line coupling a portion of the high-temperature coolant loop downstream of the first coolant pump with an actuator of the pressure-actuated valve, wherein the pressure line is filled with coolant and actuates the actuator to a first position when the first coolant pump is active, wherein the pressure line is empty and the actuator actuates to a second position when the first coolant pump is inactive, wherein the first position allows coolant to flow to the charge-air cooler without flowing to the second heat exchanger and the second position allows coolant to flow to the second heat exchanger without flowing to the charge-air cooler.

A first example of the hybrid vehicle cooling arrangement further comprises where the pressure line is sealed from outlets of the pressure-actuated valve, wherein coolant in the pressure line does not mix with coolant in the pressure-actuated valve and low-temperature coolant loop.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle having multiple propulsion torque sources, comprising:
    a high-temperature coolant circuit comprising a coolant pump; and
    a low-temperature coolant circuit comprising a pressure-actuated valve, the pressure-actuated valve being actuated by pressure from the high-temperature coolant circuit by being shaped to adjust a coolant flow through the low-temperature coolant circuit based on a pressure directly downstream of the coolant pump.

2. The system of claim 1, further comprising a pressure line coupling a portion of the high-temperature coolant circuit to the pressure-actuated valve, wherein the portion is directly downstream of the coolant pump.

3. The system of claim 2, wherein the pressure line is fluidly sealed from outlet ports of the pressure-actuated valve.

4. The system of claim 2, wherein coolant in the pressure line does not enter the low-temperature coolant circuit.

5. The system of claim 1, wherein the coolant pump is fluidly coupled to a first cylinder head coolant jacket of an engine and a turbocharger, the first cylinder head coolant jacket being arranged on an exhaust side of a cylinder head of the engine adjacent to a second cylinder head coolant jacket arranged on an intake side of the cylinder head.

6. The system of claim 5, wherein the second cylinder head coolant jacket receives coolant from a cylinder block coolant jacket of the engine.

7. The system of claim 1, wherein the low-temperature coolant circuit comprises a first heat exchanger for an engine and a second heat exchanger for an additional torque device.

8. The system of claim 7, wherein a thermostat valve adjusts coolant flow to the first heat exchanger and where the pressure-actuated valve adjusts coolant flow to the second heat exchanger.

9. The system of claim 8, further comprising a charge-air cooler in the low-temperature coolant circuit, wherein the pressure-actuated valve directs coolant in the low-temperature coolant circuit to the charge-air cooler and not to the second heat exchanger when the coolant pump is active.

10. The system of claim 9, wherein the pressure-actuated valve directs coolant in the low-temperature coolant circuit to the second heat exchanger and not to the charge-air cooler when the coolant pump is deactivated.

11. The system of claim 10, wherein the coolant pump is active when the engine is active, wherein a position of the pressure-actuated valve is adjusted via coolant directed from the coolant pump to an actuator of the pressure-actuated valve without flowing the coolant directed from the coolant pump through an outlet port of the pressure-actuated valve.

12. A hybrid vehicle comprising:
    a high-temperature coolant loop and a low-temperature coolant loop, wherein the high-temperature coolant loop comprises a first coolant pump, a cylinder head coolant jacket of an engine, a turbocharger, and a cabin heating arrangement, wherein the low-temperature coolant loop comprises a first heat exchanger for the engine, a charge-air cooler, a radiator, a second coolant pump, a pressure-actuated valve, and a second heat exchanger for a second torque device; and
    a pressure line coupling a portion of the high-temperature coolant loop between the first coolant pump and the cylinder head coolant jacket to an actuator of the pressure-actuated valve, wherein coolant in the pressure line does not mix with coolant in the low-temperature coolant loop.

13. The hybrid vehicle of claim 12, wherein the second torque device is an electric motor or a fuel cell.

14. The hybrid vehicle of claim 12, wherein the actuator is actuated to a first position when the first coolant pump is active and coolant is in the pressure line, wherein the first position blocks coolant from flowing to the second heat exchanger while allowing coolant to flow to the charge-air cooler.

15. The hybrid vehicle of claim 14, wherein the actuator is actuated to a second position when the first coolant pump is deactivated and coolant is not in the pressure line, wherein the second position allows coolant to flow to the second heat exchanger while blocking coolant from flowing to the charge-air cooler.

16. The hybrid vehicle of claim 15, wherein the first coolant pump is active whenever the engine is active.

17. The hybrid vehicle of claim 12, wherein coolant flow to the first heat exchanger is adjusted via a thermostat valve.

18. The hybrid vehicle of claim 12, wherein the second coolant pump is arranged upstream of the pressure actuated valve.

19. A hybrid vehicle cooling arrangement, comprising:
    a high-temperature coolant loop comprising a first coolant pump, a cylinder head coolant jacket of an engine, a turbocharger, and a cabin heating arrangement;
    a low-temperature coolant loop comprising a first heat exchanger for the engine, a charge-air cooler, a radiator, a second coolant pump, a pressure-actuated valve, and a second heat exchanger for an additional torque device other than the engine; and a pressure line coupling a portion of the high-temperature coolant loop downstream of the first coolant pump with an actuator of the pressure-actuated valve, wherein the pressure line is filled with coolant and actuates the actuator to a first position when the first coolant pump is active, wherein the pressure line is empty and the actuator actuates to a second position when the first coolant pump is inactive, wherein the first position allows coolant to flow to the charge-air cooler without flowing to the second heat exchanger and the second position allows coolant to flow to the second heat exchanger without flowing to the charge-air cooler.

20. The hybrid vehicle of claim 19, wherein the pressure line is sealed from outlets of the pressure-actuated valve, wherein coolant in the pressure line does not mix with coolant in the pressure-actuated valve and low-temperature coolant loop.

* * * * *